United States Patent
Nascimento et al.

(10) Patent No.: US 9,459,636 B2
(45) Date of Patent: Oct. 4, 2016

(54) TRANSITION CONTROL FOR A HYBRID SWITCHED-MODE POWER SUPPLY (SMPS)

(71) Applicant: Freescale Semiconductor, Inc., Austin, TX (US)

(72) Inventors: Ivan Carlos Ribeiro Nascimento, Campinas (BR); Edevaldo Pereira Silva, Jr., Campinas (BR)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 454 days.

(21) Appl. No.: 13/774,340

(22) Filed: Feb. 22, 2013

(65) Prior Publication Data

US 2014/0239927 A1 Aug. 28, 2014

(51) Int. Cl.
*H02M 3/156* (2006.01)
*G05F 1/10* (2006.01)
*H02M 1/00* (2006.01)

(52) U.S. Cl.
CPC ............... *G05F 1/10* (2013.01); *H02M 3/156* (2013.01); *H02M 2001/0025* (2013.01); *H02M 2001/0045* (2013.01); *H02M 2003/1566* (2013.01)

(58) Field of Classification Search
CPC .............. G05F 1/10; G05F 1/40; G05F 1/46; G05F 1/56; H02M 3/155; H02M 3/156; H02M 3/157; H02M 3/158; H02M 2001/0045; H02M 1/00; H02M 3/1563; H02M 2003/1566; H02M 2001/0003; H02M 2001/0025; H02M 3/1566
USPC ........ 323/269–277, 282–285, 351, 222–226; 363/50–58; 327/540–541; 361/18, 361/90–92
See application file for complete search history.

(56) References Cited

U.S. PATENT DOCUMENTS

| | | | |
|---|---|---|---|
| 6,064,187 A | 5/2000 | Redl et al. | |
| 6,356,063 B1 * | 3/2002 | Brooks | H02M 3/1584 323/284 |
| 6,617,834 B2 | 9/2003 | Tran | |
| 7,863,875 B1 * | 1/2011 | Guo et al. | 323/275 |
| 2001/0035745 A1 * | 11/2001 | Muratov | H02M 3/1563 323/283 |
| 2003/0048098 A1 * | 3/2003 | Tran | H02M 3/156 323/288 |
| 2003/0173941 A1 * | 9/2003 | Harris | H02M 3/156 323/282 |
| 2006/0028188 A1 * | 2/2006 | Hartular et al. | 323/273 |
| 2009/0309561 A1 * | 12/2009 | Chen | H02M 3/1563 323/282 |
| 2011/0285372 A1 * | 11/2011 | Takahashi | H02M 3/156 323/283 |
| 2012/0013322 A1 | 1/2012 | Dearborn | |
| 2012/0326688 A1 * | 12/2012 | Sun | H02M 3/1588 323/283 |
| 2014/0217998 A1 * | 8/2014 | Krueger | 323/273 |

* cited by examiner

*Primary Examiner* — Timothy J Dole
*Assistant Examiner* — Ivan Laboy Andino

(57) ABSTRACT

Systems and methods for transition control in a hybrid Switched-Mode Power Supply (SMPS). In some embodiments, a hybrid SMPS may include linear circuitry configured to produce an output voltage proportional to a variable duty cycle when the SMPS operates in linear mode and hysteretic circuitry coupled to the linear circuitry, the hysteretic circuitry configured to cause the duty cycle to assume one of two predetermined values when the SMPS operates in hysteretic mode. The hybrid SMPS may also include transition circuitry coupled to the linear circuitry and to the hysteretic circuitry, the transition circuitry configured to bypass at least a portion of the linear circuitry in response to the hybrid SMPS transitioning from the hysteretic mode to the linear mode.

16 Claims, 6 Drawing Sheets

TRANSITION CONTROL FOR A HYBRID SWITCHED-MODE POWER SUPPLY (SMPS)

FIELD

This disclosure relates generally to electronic devices, and more specifically, to systems and methods for transition control in a hybrid Switched-Mode Power Supply (SMPS).

BACKGROUND

A "power supply" is a circuit that provides energy to an electrical or electronic device. Power supplies used in modern electronic equipment include batteries, Direct Current (DC) supplies, Alternating Current (AC) supplies, etc. An example of a modern power supply is the Switched-Mode Power Supply (SMPS). In general terms, an SMPS is used to supply a regulated output voltage to a load, often at a level different than the SMPS' input voltage.

Typically, an SMPS includes circuitry configured to apply a voltage to the gate of a transistor in a switching fashion and with a given duty cycle (i.e., the ratio of on-to-off time), such that the SMPS' duty cycle regulates the output voltage. In operation, because the transistor spends most of its time switching between its two lowest dissipation states ("full on" and "full off"), less energy is wasted. Nevertheless, load disturbances that are characteristic of certain types of integrated circuits (e.g., microprocessors, microcontrollers, etc.) can still cause the output voltage of an SMPS to change in an undesirable manner. Hence, in an attempt to allow the SMPS to more quickly catch up to sudden load variations, hybrid SMPSs have been developed that are capable of operating in linear and hysteretic modes.

In a hybrid SMPS, when the output voltage is between a high threshold value and low threshold value, load variations are dealt with by linearly increasing or decreasing the SMPS' duty cycle. Then, if the output voltage reaches either the high or low threshold values, the SMPS operates in hysteretic mode. Specifically, in hysteretic mode, when the output voltage reaches the high threshold value, the duty cycle is changed to the lowest defined value (e.g., 0%). Conversely, when the output voltage reaches the low threshold value the SMPS applies its highest defined duty cycle (e.g., 100%). As such, a hybrid SMPS may be capable of steering its output voltage back to a suitable value within its linear operating range following a load disturbance.

The inventors hereof have determined, however, that the transition from hysteretic to linear mode in a hybrid SMPS may not be well behaved. For example, when the SMPS returns to linear mode after having operated in hysteretic mode, the output voltage may still be in a transient state and may reach either the high or low threshold values soon thereafter, thus promoting a persistent oscillation between linear and hysteretic modes (referred to as hysteretic oscillation) that may damage the load or otherwise cause the system to operate sub-optimally.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Disclosed herein are systems and methods for transition control in a hybrid Switched-Mode Power Supply (SMPS). The term "hybrid" is used to refer to an SMPS' ability to operate either in a hysteretic mode or in a linear mode at different times. In some embodiments, these systems and methods may facilitate the transition of a hybrid SMPS from hysteretic mode back to linear mode after a load disturbance, input voltage variation, temperature change, or the like. Upon detection of an initial overvoltage or undervoltage occurrence that causes the hybrid SMPS to operate in hysteretic mode, certain systems and methods described below can operate to reduce the possibility of a subsequent overvoltage or undervoltage occurrence during a selected observation period. For example, a transition control circuit may control aspects of the operation of the hybrid SMPS' linear circuitry during the hybrid SMPS' transition between hysteretic mode and linear mode in a manner that minimizes or reduces overvoltage or undervoltage conditions.

In many implementations, systems and methods disclosed herein may be incorporated into a wide range of electronic devices including, for example, computer systems or Information Technology (IT) products such as servers, desktops, laptops, switches, routers, etc.), telecommunications hardware, consumer devices or appliances such as mobile phones, tablets, television sets, cameras, sound systems, etc., scientific instrumentation, industrial robotics, medical or laboratory electronics such as imaging, diagnostic, or therapeutic equipment, etc., transportation vehicles such as automobiles, buses, trucks, trains, watercraft, aircraft, etc., military equipment, etc. More generally, these systems and methods may be incorporated into any device or system having one or more electronic parts or components.

Figure 1:
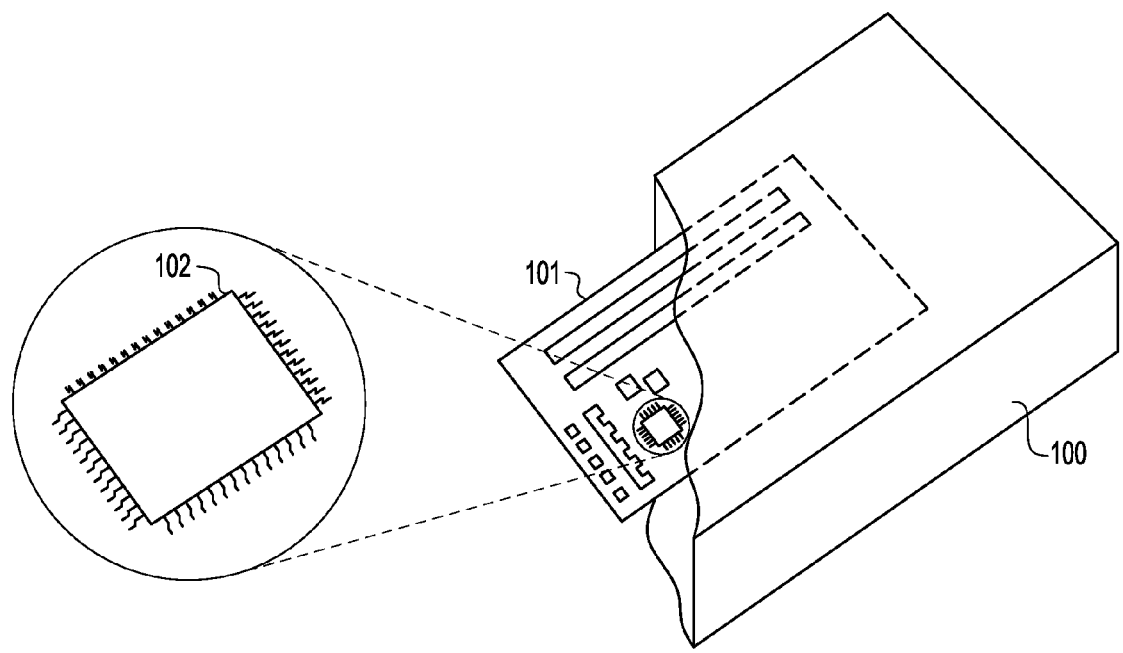
FIG. 1 is a diagram of an example of a Printed Circuit Board (PCB) of a device having one or more electronic chips, according to some embodiments.

Turning to FIG. 1, a block diagram of electronic device 100 is depicted. In some embodiments, electronic device 100 may be any of the aforementioned electronic devices, or any other electronic device. As illustrated, electronic device 100 includes one or more Printed Circuit Boards (PCBs) 101, and at least one of PCBs 101 includes one or more chips 102. In some implementations, one or more integrated circuits (ICs) within chip 102 may implement a hybrid SMPS and/or systems and methods for transition control in a hybrid SMPS.

Examples of IC(s) may include, for instance, a System-On-Chip (SoC), an Application Specific Integrated Circuit (ASIC), a Digital Signal Processor (DSP), a Field-Programmable Gate Array (FPGA), a processor, a microprocessor, a controller, a microcontroller (MCU), a Graphics Processing Unit (GPU), or the like. Additionally or alternatively, IC(s) may include a memory circuit or device such as, for example, a Random Access Memory (RAM), a Static RAM (SRAM), a Magnetoresistive RAM (MRAM), a Nonvolatile RAM (NVRAM, such as "FLASH" memory, etc.), and/or a Dynamic RAM (DRAM) such as Synchronous DRAM (SDRAM), a Double Data Rate RAM, an Erasable Programmable ROM (EPROM), an Electrically Erasable Programmable ROM (EEPROM), etc. Additionally or alternatively, IC(s) may include one or more mixed-signal or analog circuits, such as, for example, Analog-to-Digital Converter (ADCs), Digital-to-Analog Converter (DACs), Phased Locked Loop (PLLs), oscillators, filters, amplifiers, etc. Additionally or alternatively, IC(s) may include one or more Micro-ElectroMechanical Systems (MEMS), Nano-Electro-Mechanical Systems (NEMS), or the like.

Accordingly, an IC within chip 102 may include a number of different portions, areas, or regions. These various portions may include one or more processing cores, cache memories, internal bus(es), timing units, controllers, analog sections, mechanical elements, etc. Thus, in various embodiments, IC(s) may include a circuit configured to receive two or more supply voltages (e.g., two, three, four, etc.). In some implementations, a supply voltage may be of the order of 10 V±10%, 5 V±10%, 1.2 V±10%, etc.

Generally speaking, chip 102 may include an electronic component package configured to be mounted onto PCB 101 using any suitable packaging technology such as, for example, Ball Grid Array (BGA) packaging or the like. In some applications, PCB 101 may be mechanically mounted within or fastened onto electronic device 100. It should be noted that, in certain implementations, PCB 101 may take a variety of forms and/or may include a plurality of other elements or components in addition to chip 102. It should also be noted that, in some embodiments, PCB 101 may not be used.

Although the example of FIG. 1 shows electronic chip 102 in monolithic form, it should be understood that, in alternative embodiments, the systems and methods described herein may be implemented with discrete components. For example, in some cases, one or more discrete capacitors, inductors, transistors, etc. may be located outside of chip 102. Moreover, one or more of these external components may be operably coupled to an integrated circuit fabricated within chip 102.

Figure 2:
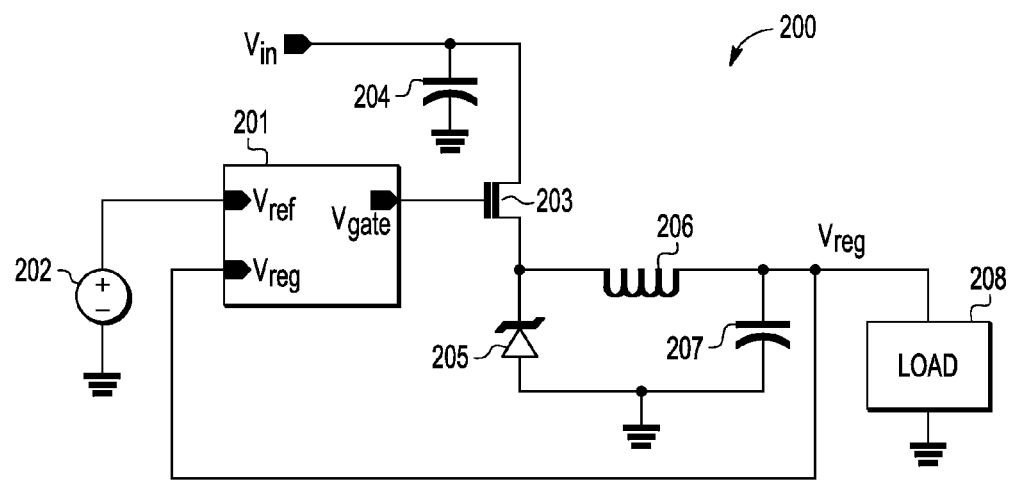
FIG. 2 is a circuit diagram of an example of a hybrid Switched-Mode Power Supply (SMPS) according to some embodiments.

FIG. 2 is a circuit diagram of an example of hybrid SMPS 200 according to some embodiments. As illustrated, voltage source 202 provides reference voltage $V_{ref}$ to control circuit 201. In some cases, for instance, voltage source 202 may be a bandgap reference circuit or the like. Control circuit 201 applies voltage $V_{gate}$ to the gate of transistor 203, which may be P-type Metal-Oxide Semiconductor (PMOS) transistor or the like. In other examples, however, an N-type MOS (NMOS) may be used. The source of transistor 203 is coupled to input voltage $V_{in}$ in parallel with coupling capacitor 204. Diode 205 and inductor or coil 206 are coupled to the drain of transistor 203. As such, in this configuration, diode 205, inductor 206, and capacitor 207 form a network configured to output an approximately constant, regulated voltage $V_{reg}$ to electrical load 208. Output voltage $V_{reg}$ is fed back into a corresponding pin of control circuit 201.

Here it should be noted that hybrid SMPS 200 of FIG. 2 is being used to implement an asynchronous buck (step-down) DC-DC converter, but that is for sake of illustration only. In other embodiments, other types DC-DC converters may be implemented using hybrid SMPS 200 including, but not limited to, boost (step-up) converters, buck-boost converters, Single-Ended Primary-Inductor Converter (SEPIC) converters, etc.

In some embodiments, load 208 may include a processor, a processor core, a microcontroller, a memory device, etc. For example, in various embodiments, load 208 may be general-purpose or embedded processor(s) implementing any of a variety of Instruction Set Architectures (ISAs), such as the x86, RISC®, PowerPC®, ARM®, etc. Additionally or alternatively, load 208 may be an application-specific processing unit such as, for example, a GPU, SoC, ASIC, DSP, FPGA, MCU, etc. Additionally or alternatively, load 208 may include a memory circuit such as, for example, RAM, SRAM, MRAM, NVRAM, FLASH, DRAM, SDRAM, DDR SDRAM, EPROM, EEPROM, etc. More generally, however, load 208 may be an integrated or discrete device or system.

In operation, control circuit 201 applies $V_{gate}$ to the gate of transistor 203 in a switching fashion and with an adjustable duty cycle, which may then be selected to regulate the value of $V_{reg}$. Here, the term "duty cycle" refers to the percent of time that $V_{gate}$ is active (e.g., at a logic high) as a fraction of the total time under consideration. Moreover, hybrid SMPS 200 may be configured to operate in linear mode and in hysteretic mode.

When operating in linear mode, control circuit 201 monitors the value of $V_{reg}$ (through the $V_{reg}$ pin) and adjusts the duty cycle of $V_{gate}$ in order to counteract load variations, for example, and therefore maintain a desired $V_{reg}$ value. For instance, if at a certain point load 208 begins drawing less current than before, $V_{reg}$ will tend to rise. Accordingly, control circuit 201 may decrease the duty cycle of $V_{gate}$ in an attempt to maintain $V_{reg}$ at its desired value. Then, if load 208 begins drawing more current than before, $V_{reg}$ tends to fall, and control circuit 201 increases the duty cycle of $V_{gate}$ again to maintain $V_{reg}$.

In the presence of large and/or sudden load variations, however, hybrid SMPS 200 may operate in hysteretic mode. In hysteretic mode, when $V_{reg}$ rises above a high threshold value ($V_h$), control circuit 201 changes the duty cycle of $V_{gate}$ to its lowest defined value (e.g., 0%). Conversely, when $V_{reg}$ falls below a low threshold value ($V_l$), control circuit 201 changes the duty cycle of $V_{gate}$ to its highest defined value (e.g., 100%). As such, control circuit 201 may be capable of steering $V_{reg}$ back to a suitable value within the linear operating range of hybrid SMPS 200 following a load disturbance.

Here it should be noted that, although referred to as load variations or disturbances, there may be other reasons why $V_{reg}$ may tend to change. For example, variations in supply voltage $V_{in}$, ambient temperature, etc. may also cause changes in $V_{reg}$ that are correctable by control circuit 201 in a similar fashion as described herein.

Figure 3:
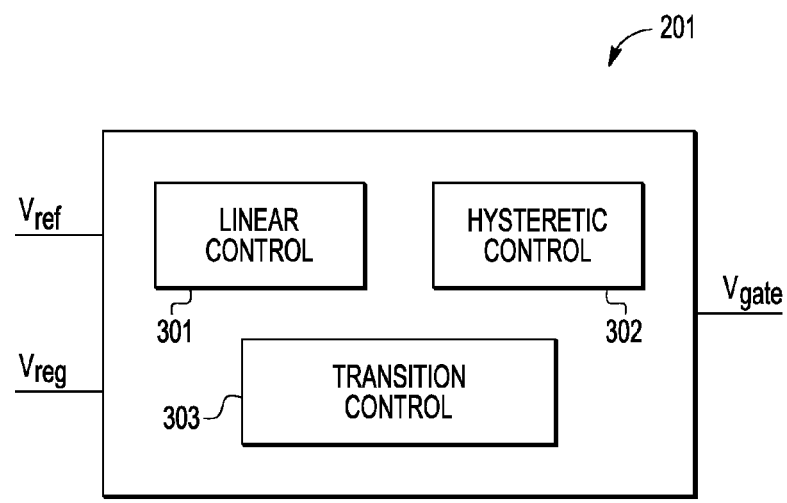
FIG. 3 is a block diagram of an example of a control circuit according to some embodiments.

FIG. 3 is a block diagram of an example of control circuit 201 according to some embodiments. Generally speaking, control circuit 201 includes linear control block or circuit 301, hysteretic control block or circuit 302, and transition control block or circuit 303. Input terminals $V_{ref}$ and $V_{reg}$, and output terminal $V_{gate}$, are the same as shown in FIG. 2. Linear control block 301 and hysteretic control block 302 may implement the linear and hysteretic modes of operation of hybrid SMPS, respectively.

Transition control block 303 operates to facilitate the transition of a hybrid SMPS from hysteretic mode back to linear mode so as to reduce the possibility of the output voltage remaining in a transient state after the transition (e.g., by either reaching the high or low threshold values soon thereafter). Thus, transition control block 303 operates to avoid hysteretic oscillations. As described in more detail below, transition control block 303 may modify the operation of linear control block 301 during hysteretic mode.

Figure 4:
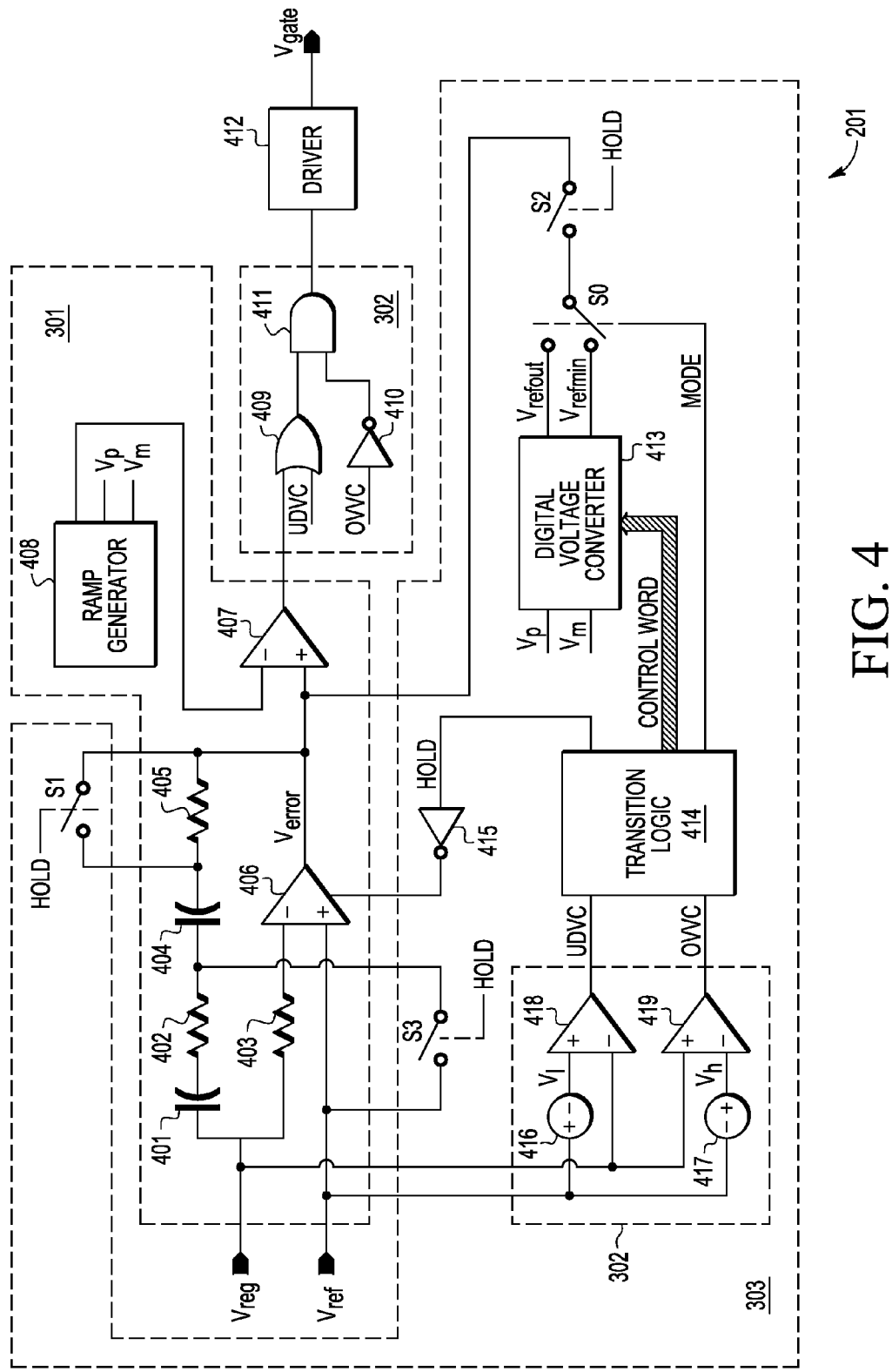
FIG. 4 is a circuit diagram of an example of a control circuit according to some embodiments.

FIG. 4 is a circuit diagram of an example of control circuit 201 according to some embodiments. As in FIG. 3, control circuit 201 is again divided into linear control circuit 301, hysteretic control circuit 302, and transition control circuit 303. Linear circuit 301 includes error amplifier 406, which receives $V_{ref}$ at is non-inverting input and $V_{reg}$ (through resistor 403) at its inverting input. The output of error amplifier, $V_{error}$, is fed back into amplifier 406 via a feedback network including resistor 405, capacitor 404, resistor 402, capacitor 401, and resistor 403. Also, $V_{error}$ is provided to the non-inverting input of comparator 407, which receives a ramp signal at its inverting input as generated by ramp generator 408 and based upon parameters $V_p$ (maximum ramp voltage) and $V_m$ (minimum ramp voltage).

In operation, linear control circuit 301 essentially compares $V_{reg}$ against $V_{ref}$. If $V_{reg}$ is smaller than $V_{ref}$, as determined by error amplifier 406, the duty cycle of the signal that is output by comparator 407 increases. Conversely, if $V_{reg}$ is greater than $V_{ref}$, the duty cycle of the signal output by comparator 407 decreases. If, however, an overvoltage or undervoltage condition occurs; that is, if $V_{reg}$ becomes greater than a high threshold voltage or smaller than a low threshold voltage, respectively; then hybrid SMPS starts operating in hysteretic mode.

To facilitate the transition to hysteretic mode, the output of comparator 407 in linear control circuit 301 is provided to hysteretic circuit 302. In particular, OR gate 409 receives the output of comparator 407 as well as a signal indicating the presence (udvc="1") or absence (udvc="0") of an under voltage condition ("udvc"). A signal indicating the presence (ovvc="1") or absence (ovvc="0") of overvoltage condition ("odvc") is input into inverter 401. A discussion of the generation of udvc and ovvc is provided in more detail below. The outputs of OR gate 409 and inverter 410 are provided as inputs to AND gate 411. The output of AND gate 411 is provided to driver circuit 412, which in turn outputs $V_{gate}$.

Operation in hysteretic mode may be explained as follows. When an undervoltage condition is detected (that is, $V_{reg}$ is smaller than a low voltage threshold $V_l$), the output of OR gate 409 and inverter 410 are both at a logic high and the output of AND gate 411 is also at a logic high; therefore driver 412 receives a constant "1" signal that causes $V_{gate}$ to have a 100% duty cycle (or some other predetermined high value). On the other hand, when an overvoltage condition is detected (that is, $V_{reg}$ is greater than a high voltage threshold $V_h$), the output of inverter 410 is at a logic low and the output of AND gate 411 is also at a logic low; therefore driver 412 receives a constant "0" signal that causes $V_{gate}$ to have a 0% duty cycle (or some other predetermined low value).

When hysteretic mode is triggered, transition control circuit 303 operates to facilitate transition back into linear mode and to avoid hysteretic oscillation. Specifically, a preselected voltage (e.g., ~20 mV) is subtracted from reference voltage $V_{ref}$ by element 416 to result in a low threshold voltage $V_l$, which is coupled to the non-inverting input of comparator 418. Another preselected voltage is added to reference voltage $V_{ref}$ by element 417 to result in a high threshold voltage $V_h$, which in turn is coupled to the inverting input of comparator 419. $V_{reg}$ is coupled to the inverting input of comparator 418, and to the non-inverting input of comparator 419.

Therefore, comparator 418 works as undervoltage detector (i.e., udvc is at a logic high when $V_{reg}$ is smaller than $V_l$) and comparator 419 works as an overvoltage detector (i.e., ovvc is at a logic high when is $V_{reg}$ is greater than $V_h$). These udvc and ovvc signals are then provided to transition logic 414 and also to hysteretic circuit 302, as previously discussed.

When udvc or ovvc signals are detected and the power supply is operating in hysteretic mode, transition logic 414 applies a "hold" signal (hold="1") to error amplifier 406 of linear control circuit 401 through inverter 415 and to switches S1-S3 in order to shortcut the inputs to amplifier 406 and to allow a preselected voltage value $V_{refout}$ to be applied to the output of amplifier 406; thus effectively bypassing error amplifier 406 and forcing its output $V_{error}$ to a known value.

To select $V_{refout}$, transition logic 414 issues a "control word" signal to digital voltage converter 413. The control word may be, for example, a 5-bit word or the like (although any other suitable number of bits may be used). Digital voltage converter 413 receives the control word as well as $V_p$ and $V_m$ values (maximum and minimum values of the ramp generated by block 408), and outputs $V_{refout}$, which is then applied to the output of amplifier 406 through switch S2. Values for control word and $V_{refout}$ may be selected, for example, as discussed in FIG. 5. Once udvc or ovvc signals are no longer detected, this indicates that the power supply is again operating in linear mode. Accordingly, transition logic 414 stops issuing the hold signal.

In some implementations, transition logic 414 may also control the power supply to operate in continuous or discontinuous current mode. Returning briefly to FIG. 2, when the electrical current through inductor 206 has a waveform such that its minimum value is above 0 V, inductor 206 is operating in continuous current mode. Conversely, when the electrical current through inductor 206 has a waveform that would have a minimum value below 0 V but for the presence of diode 205, inductor 206 is said to be operating in discontinuous current mode. Referring back to FIG. 4, in continuous current mode, S0 couples $V_{refout}$ to S2, whereas in discontinuous current mode S0 couples $V_{refmin}$ to S2. For example, $V_{refmin}$ may be selected to result in fixed duty cycle (e.g., 10%) that is more suitable for operation with low electrical currents.

In various embodiments, the modules or blocks shown in FIGS. 3 and 4 may represent processing circuitry, logic functions, and/or data structures. Although these modules are shown as distinct blocks, in other embodiments at least some of the operations performed by these modules may be combined in to fewer blocks. Conversely, any given one of the modules of FIGS. 3 and 4 may be implemented such that its operations are divided among two or more logical blocks. Although shown with a particular configuration, in other embodiments these various modules or blocks may be rearranged in other suitable ways.

Figure 5:
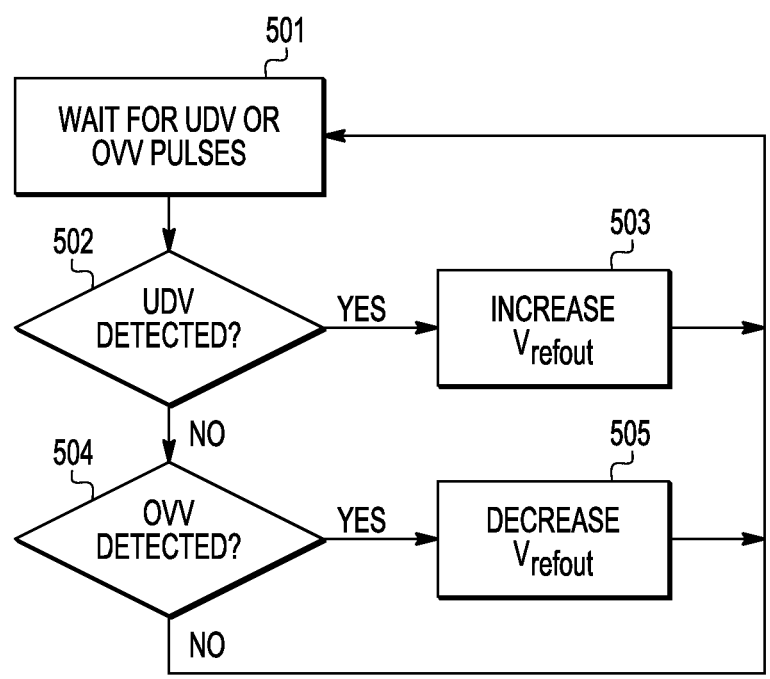
FIG. 5 is a flowchart illustrating operations of a transition control circuit according to some embodiments.

FIG. 5 is a flowchart illustrating operations of transition control circuit 303 according to some embodiments. At block 501, transition control circuitry 303 may wait for undervoltage or overvoltage pulses or signals indicative of an undervoltage or overvoltage condition, which in turn indicates that the power supply is operating in hysteretic mode. At block 502, if an undervoltage condition is detected, control passes to block 503, where transition control circuitry 301 generates a digital control word that causes digital voltage converter 413 to increase the value of $V_{refout}$. At block 504, if an overvoltage condition is detected, control passes to block 505, where transition control circuitry 301 generates another digital control word that causes digital voltage converter 413 to decrease the value of $V_{refout}$.

Otherwise, control returns to block 501. In some embodiments, a number of predetermined control word values (e.g., 32 values), each value corresponding to a given duty cycle from 0% to 100% in equal increments, may be used thus allowing $V_{refout}$ to assume any of those values as discussed below.

In some embodiments, the method of FIG. 5 may be active during a preselected period of time, also referred to as "observation period." In some cases, the observation period may begin upon detection of a first overvoltage or undervoltage condition; that is, when the power supply switches from linear mode to hysteretic mode. The observation period may then last for a selected time—e.g., 20 μs—and may be extended by subsequent pulses during the observation period. During the observation period, repeated undervoltage or overvoltage conditions may cause transition control circuitry 301 to incrementally change its control word so as to change $V_{refout}$ accordingly.

For example, upon detection of a first overvoltage condition (block 504), a first control word may be issued (block 505). If, during the same observation period, a second overvoltage is again detected, a second control word having a lower value than the first control word may be issued, and so on. If, however, another overvoltage condition is detected but only after expiration of the observation period, the same control word used in the immediately preceding observation period may be used. Conversely, upon detection of a first undervoltage condition (block 502), a first control word may be issued (block 503). If, during the same observation period, a second undervoltage is again detected, a second control word having a higher value than the first control word may be issued, and so on. Then, if yet another undervoltage condition is detected but only after expiration of the observation period, the same control word used in the immediately preceding observation period may be used.

As another example, consider the following operations. Upon detection of a first undervoltage condition (block 502), a first control word may be issued (block 503) having a value of "16" (e.g., in a five-bit word). If then a second undervoltage condition (block 502) is detected prior to expiration of the observation period, a second control word may be issued (block 503) having a value of "17" that is, incrementally higher than the previous value (assuming that $V_{refout}$ (17) is greater than $V_{refout}$(16)). Conversely, if an overvoltage condition (block 504) is detected after the first undervoltage condition and still prior to expiration of the observation period, a control word may be issued (block 505) having a value of "15" (that is, incrementally smaller than the first value).

In some implementations, after the observation period has expired, the last stored value may be used. Alternatively, the last stored value may be incremented or decremented depending upon whether, during a subsequent observation period, an undervoltage or overvoltage condition is detected first, respectively.

The method of FIG. 5 can enable a smooth transition between hysteretic and linear control modes in an SMPS. Rather than stepping from a 100% or a 0% duty cycle at the end of the hysteretic period, a more nuanced transition can be performed that prevents or at least reduces subsequent overvoltage or undervoltage situations from occurring during a preselected observation period.

It should be understood that the various operations described herein, particularly in connection with FIG. 5, may be implemented by processing circuitry or other hardware components. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

Figure 6:
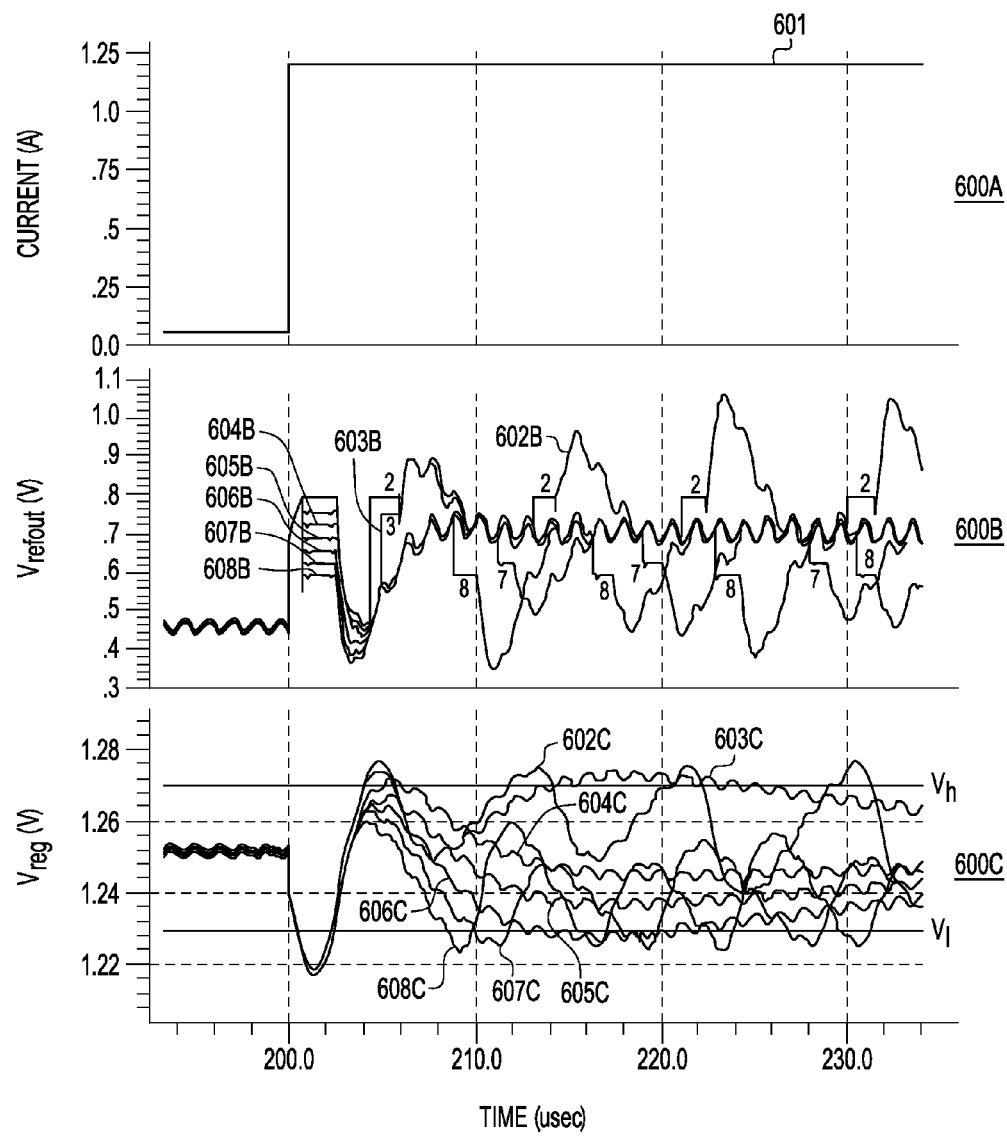
FIG. 6 shows graphs illustrating voltage selection operations of a transition control circuit according to some embodiments.

FIG. 6 shows graphs illustrating voltage selection operations of transition control circuitry 303 according to some embodiments. Particularly, graph 600A shows a current being drawn by a load as curve 601. In this case, curve 601 sharply increases from approximately 0.06 A to 1.2 A at t=200 μs, thus creating an undervoltage condition and triggering hysteretic operation.

Graph 600B shows different values of $V_{refout}$ applied at the output node of amplifier 406 by transition control circuit 303 in different scenarios. Particularly, curve 602B shows $V_{refout}$ as approximately 0.8 V, curve 603B shows $V_{refout}$ as approximately 0.76 V, curve 604B shows $V_{refout}$ as approximately 0.73 V, curve 605B shows $V_{refout}$ as approximately 0.7 V and so on down to curve 607B, which shows $V_{refout}$ as approximately 0.6 V. Meanwhile, graph 600C shows the regulated output voltage $V_{reg}$ results in those same scenarios. Specifically, curve 602C shows a $V_{reg}$ corresponding to the $V_{refout}$ of curve 602B, curve 603C shows a $V_{reg}$ corresponding to the $V_{refout}$ of curve 603B, and so on. Horizontal lines representing $V_h$ (at approximately at 1.27 V) and $V_l$ (at approximately at 1.23 V) are also shown.

Here it is noted that, if the $V_{refout}$ value chosen by the control word is too high (e.g., curve 602B), $V_{reg}$ bounces back (e.g., 602C) in the form of a subsequent overvoltage condition within the observation period, which in this example is set to 20 μs. Conversely, if the $V_{refout}$ value chosen by the control word is too low (e.g., curve 608B), $V_{reg}$ bounces back (e.g., 608C) in the form of a subsequent undervoltage condition within the observation period. Other values of $V_{refout}$ (e.g., curves 604B-606B) produce smooth returns from hysteretic to linear mode (e.g., curves 604-606C). In other words, in some cases, there may be range of control words that produce $V_{refout}$ values that prevent $V_{reg}$ oscillation within the observation period; one or more of which may be found using the method of FIG. 5.

Figure 7:
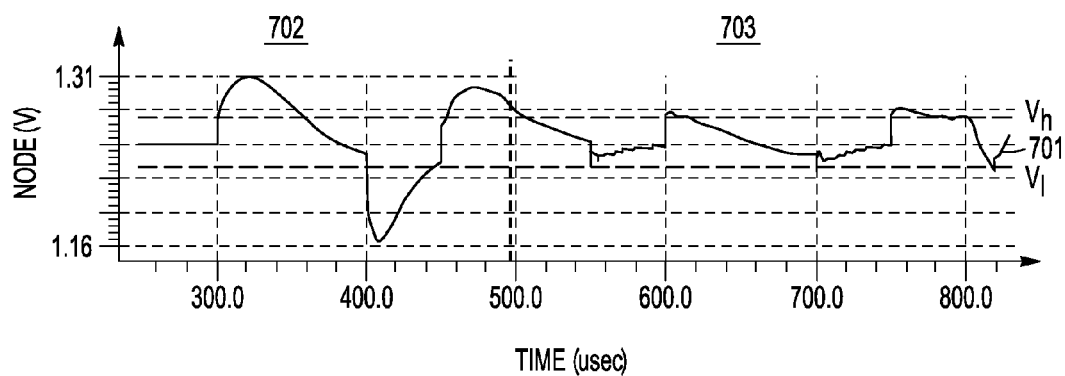
FIG. 7 shows graphs comparing operations of a hybrid SMPS according to some embodiments.

FIG. 7 shows graphs comparing operations of a hybrid SMPS according to some embodiments. Particularly, curve 701 shows $V_{reg}$ with respect to $V_h$ and $V_l$ over time. In this example, hysteretic control circuit 302 and transition control circuit 303 are turned off prior to time t=500 μs and turned on after that. As such, it may be seen that, upon each occurrence of an overvoltage or undervoltage condition prior to t=500 μs, $V_{reg}$ 701 has much larger overvoltage and undervoltage peaks, and takes a greater amount of time to recover to linear-only mode (702) than after transition control circuit 303 is turned on (703). Thus, in some cases, transition control circuit 303 may not only smoothen the transition from hysteretic to linear mode thus reducing or eliminating hysteretic oscillations, but it may also speed up the recovery process by increasing the overall amount of time that the SMPS operates in linear mode.

In an illustrative, non-limiting embodiment, a hybrid SMPS may include linear circuitry configured to produce an output voltage proportional to a variable duty cycle when the SMPS operates in linear mode and hysteretic circuitry coupled to the linear circuitry, the hysteretic circuitry configured to cause the duty cycle to assume one of two predetermined values when the SMPS operates in hysteretic mode. The hybrid SMPS may also include transition control circuitry coupled to the linear circuitry and to the hysteretic circuitry, the transition control circuitry configured to bypass at least a portion of the linear circuitry in response to the hybrid SMPS transitioning from the hysteretic mode to the linear mode.

For example, the hysteretic circuitry may be configured to cause the duty cycle to assume a high predetermined value in response to the output voltage dropping below a low threshold value. Moreover, the hysteretic circuitry may be configured to cause the duty cycle to assume a low predetermined value in response to the output voltage rising above a high threshold value.

In some implementations, the linear circuitry may include an error amplifier configured to indicate a difference between a reference voltage and the output voltage, and wherein the transition control circuitry is configured to control a voltage applied at an output node of the error amplifier. Also, the transition control circuitry may be configured to identify overvoltage or undervoltage conditions with respect to the output voltage. Accordingly, in response to having identified a first overvoltage or undervoltage condition, the transition control circuitry may be configured to produce a first control word translatable by a digital voltage converter into a first voltage level to be applied to the output node of the error amplifier.

Then, in response to having identified a second overvoltage or undervoltage condition following the first overvoltage or undervoltage condition and prior to expiration of an observation period, the transition control circuitry may be configured to produce a second control word different from the first control word and translatable by the digital voltage converter into a second voltage level to be applied to the output node of the error amplifier. Additionally or alternatively, in response to having identified a second overvoltage or undervoltage condition following the first overvoltage or undervoltage condition and after expiration of an observation period, the transition control circuitry may be configured to produce the first control word translatable by the digital voltage converter into the first voltage level to be applied to the output node of the error amplifier.

In some cases, in response to determining that the hybrid SMPS is operating in discontinuous current mode, the transition control circuitry may be configured to cause a fixed voltage value produced by the digital voltage converter to be applied to the output node of the error amplifier.

In another illustrative, non-limiting embodiment, a method of operating a hybrid Switched-Mode Power Supply (SMPS) may include producing, while in a linear mode of operation, an output voltage that is proportional to a duty cycle, entering a hysteretic mode of operation to cause the duty cycle to assume a first predetermined value in response to an undervoltage occurrence or a second predetermined value in response to an overvoltage occurrence, and returning to the linear mode of operation, at least in part, by controlling the duty cycle to reduce a possibility of a subsequent undervoltage or overvoltage occurrence taking place during a selected time period. In some embodiments, controlling the output voltage may include shortcutting the inputs of an amplifier within the hybrid SMPS, and applying a selected voltage to the output of the amplifier.

The method may also include, in response to the undervoltage or overvoltage occurrence, producing a first control word translatable into a first voltage level to be applied to the output of the amplifier. Then, in response to a subsequent overvoltage occurrence taking place prior to expiration of the selected time period, the method may further include producing a second control word different from the first control word and translatable into a second voltage level to be applied to the output of the amplifier, the second voltage level lower than the first voltage level.

In some cases, in response to a subsequent overvoltage occurrence taking place after expiration of the selected time period, the method may include maintaining the first control word. In response to the undervoltage or overvoltage occurrence, the method may include producing a first control word translatable into a first voltage level to be applied to the output of the amplifier.

In other cases, in response to a subsequent undervoltage occurrence taking place prior to expiration of the selected time period, the method may include producing a second control word different from the first control word and translatable into a second voltage level to be applied to the output of the amplifier, the second voltage level higher than the first voltage level. The method may also include, in response to a subsequent undervoltage occurrence taking place after expiration of the selected time period, maintaining the first control word.

In yet another illustrative, non-limiting embodiment, an electronic chip may include a transition control circuit coupled to a linear circuit and to a hysteretic circuit of a hybrid Switched-Mode Power Supply (SMPS), the transition circuit configured to facilitate the hybrid SMPS' transition from a hysteretic mode of operation to a linear mode of operation.

For example, the linear circuit may be configured to produce an output voltage proportional to a variable duty cycle when the hybrid SMPS operates in the linear mode, the hysteretic circuit may be configured to cause the duty cycle to assume one of two predetermined values when the hybrid SMPS operates in the hysteretic mode, and the transition circuit may be configured to reduce a number of subsequent undervoltage or overvoltage occurrences during a given observation period. Moreover, the transition control circuit may be configured to bypass an amplifier within the linear circuit by applying a digitally selected voltage to an output of the amplifier.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A hybrid Switched-Mode Power Supply (SMPS), comprising:
   linear circuitry configured to produce an output voltage proportional to a variable duty cycle when the SMPS operates in linear mode, the linear circuitry comprising an error amplifier configured to provide an error voltage at an output node based upon a comparison between a reference voltage received at a first input node and the output voltage received at a second input node;
   hysteretic circuitry coupled to the linear circuitry, the hysteretic circuitry configured to cause the duty cycle to assume one of two predetermined values when the SMPS operates in hysteretic mode; and
   transition control circuitry coupled to the linear circuitry and to the hysteretic circuitry, the transition control circuitry coupled to a first, second, and third switches configured to bypass at least a portion of the linear circuitry in response to the hybrid SMPS transitioning from the hysteretic mode to the linear mode by applying a hold signal to the first, second, and third switches, wherein the hold signal is configured to close the first and second switches to shortcut the first and second inputs nodes of the error amplifier, respectively, and wherein the hold signal is further configured to close the third switch to force the output node of the error amplifier to a selected voltage level.

2. The hybrid SMPS of claim 1, wherein the hysteretic circuitry is configured to cause the duty cycle to assume a high predetermined value in response to the output voltage dropping below a low threshold value.

3. The hybrid SMPS of claim 1, wherein the hysteretic circuitry is configured to cause the duty cycle to assume a low predetermined value in response to the output voltage rising above a high threshold value.

4. The hybrid SMPS of claim 1, wherein the transition control circuitry is configured to identify an overvoltage or undervoltage condition with respect to the output voltage.

5. The hybrid SMPS of claim 4, wherein in response to determining that the hybrid SMPS is operating in discontinuous current mode, the transition control circuitry is configured to cause a fixed voltage value produced by the digital voltage converter to be applied to the output node of the error amplifier via a fourth switch.

6. The hybrid SMPS of claim 4, wherein in response to having identified a first overvoltage or undervoltage condition while the SMPS is operating in the hysteretic mode, the transition control circuitry is configured to produce a first control word translatable by a digital voltage converter into the selected voltage level applied to the output node of the error amplifier via the third switch.

7. The hybrid SMPS of claim 6, wherein in response to having identified a second overvoltage condition following the first overvoltage condition and prior to expiration of an observation period, the transition control circuitry is configured to produce a second control word having a value smaller than the first control word and translatable by the digital voltage converter into another voltage level smaller than the selected voltage level, and wherein the transition control circuitry is further configured to apply the other voltage level to the output node of the error amplifier via the third switch.

8. The hybrid SMPS of claim 6, wherein in response to having identified a second undervoltage condition following the first undervoltage condition and prior to expiration of an observation period, the transition control circuitry is configured to produce a second control word having a value higher than the first control word and translatable by the digital voltage converter into another voltage level greater than the selected voltage level, and wherein the transition control circuitry is further configured to apply the other voltage level to the output node of the error amplifier via the third switch.

9. A method of operating a hybrid Switched-Mode Power Supply (SMPS), the method comprising:
   producing, while in a linear mode of operation, an output voltage that is proportional to a duty cycle;
   entering a hysteretic mode of operation to cause the duty cycle to assume: (a) a first predetermined value in response to an undervoltage occurrence, or (b) a second predetermined value in response to an overvoltage occurrence;
   during a return of the SMPS from the hysteric mode of operation to the linear mode of operation, averting transitions between the linear and hysteric modes of operation during a selected time period by issuing a hold signal, wherein the hold signal shortcuts a first input and a second input of an error amplifier within the hybrid SMPS by closing a first switch and a second switch, respectively, and wherein the hold signal further allows a digitally selected voltage to be applied to an output of the error amplifier by closing a third switch; and
   gradually increasing or decreasing the digitally selected voltage in response to subsequent undervoltage or overvoltage occurrences taking place during the selected time period, respectively.

10. The method of claim 9, further comprising, in response to the overvoltage occurrence, producing a first control word translatable into the digitally selected first voltage applied to the output of the error amplifier.

11. The method of claim 10, further comprising, in response to a subsequent overvoltage occurrence taking place prior to expiration of the selected time period, producing a second control word different from the first control word and translatable into a second digitally selected voltage to be applied to the output of the error amplifier, the second digitally selected voltage lower than the digitally selected voltage.

12. The method of claim 10, further comprising, in response to a subsequent overvoltage occurrence taking place after expiration of the selected time period, maintaining the first control word.

13. The method of claim 9, further comprising, in response to the undervoltage occurrence, producing a first control word translatable into the digitally selected first voltage applied to the output of the error amplifier.

14. The method of claim 13, further comprising, in response to a subsequent undervoltage occurrence taking place prior to expiration of the selected time period, producing a second control word different from the first control word and translatable into a second digitally selected voltage to be applied to the output of the error amplifier, the second digitally selected voltage higher than the digitally selected voltage.

15. The method of claim 13, further comprising, in response to a subsequent undervoltage occurrence taking place after expiration of the selected time period, maintaining the first control word.

16. An electronic chip having a hybrid Switched-Mode Power Supply (SMPS), the electronic chip comprising:
- a linear circuit;
- a hysteretic circuit coupled to the linear circuit; and
- a transition control circuit coupled to the linear circuit and to the hysteretic circuit, the transition circuit configured to control an output of the hybrid SMPS during the SMPS' transition from a hysteretic mode of operation to a linear mode of operation, wherein the linear circuit is configured to produce an output voltage proportional to a variable duty cycle when the hybrid SMPS operates in the linear mode, wherein the hysteretic circuit is configured to cause the duty cycle to assume one of two predetermined values when the hybrid SMPS operates in the hysteretic mode, wherein the transition control circuit is configured to bypass an error amplifier within the linear circuit by applying a hold signal configured to close a first switch and a second switch to shortcut inputs of the error amplifier, respectively, wherein the hold signal is further configured to close a third switch to force an output of the error amplifier to a digitally selected voltage level, and wherein the transition control circuit is further configured to gradually increase or decrease the digitally selected voltage level in response to subsequent undervoltage or overvoltage occurrences respectively taking place during an observation period while the SMPS transitions from the hysteretic mode of operation to the linear mode of operation.

* * * * *